(12) United States Patent
Lin et al.

(10) Patent No.: US 9,167,270 B2
(45) Date of Patent: Oct. 20, 2015

(54) METHODS AND APPARATUS FOR EFFICIENT ADAPTIVE FILTERING FOR VIDEO ENCODERS AND DECODERS

(75) Inventors: Weiyao Lin, Seattle, WA (US); Yunfei Zheng, San Diego, CA (US); Peng Yin, Ithaca, NY (US); Joel Sole, La Jolla, CA (US); Xiaoan Lu, Princeton, NJ (US); Qian Xu, Folsom, CA (US)

(73) Assignee: THOMSON LICENSING, Issy les Moulineaux (FR)

( * ) Notice: Subject to any disclaimer, the term of this patent is extended or adjusted under 35 U.S.C. 154(b) by 662 days.

(21) Appl. No.: 13/497,476

(22) PCT Filed: Oct. 15, 2010

(86) PCT No.: PCT/US2010/002759
§ 371 (c)(1),
(2), (4) Date: Mar. 21, 2012

(87) PCT Pub. No.: WO2011/046617
PCT Pub. Date: Apr. 21, 2011

(65) Prior Publication Data
US 2013/0016768 A1      Jan. 17, 2013

Related U.S. Application Data

(60) Provisional application No. 61/251,934, filed on Oct. 15, 2009.

(51) Int. Cl.
*H04N 19/117* (2014.01)
*H04N 19/14* (2014.01)
(Continued)

(52) U.S. Cl.
CPC ............ *H04N 19/85* (2014.11); *H04N 19/117* (2014.11); *H04N 19/14* (2014.11); *H04N 19/147* (2014.11);
(Continued)

(58) Field of Classification Search
CPC ... H04N 19/117; H04N 19/14; H04N 19/147; H04N 19/17; H04N 19/172; H04N 19/176; H04N 19/192; H04N 19/46; H04N 19/61; H04N 19/70; H04N 19/82; H04N 19/85; H04N 7/26058; H04N 7/26127; H04N 7/26154; H04N 7/26244; H04N 7/26271; H04N 7/26276; H04N 7/26313; H04N 7/26319; H04N 7/26382; H04N 7/26882
USPC ....................................... 375/240.01–240.26
See application file for complete search history.

(56) References Cited

U.S. PATENT DOCUMENTS 6,178,205 B1 * 1/2001 Cheung et al. ........... 375/240.29
8,189,934 B2    5/2012 Wittmann et al.
(Continued)

FOREIGN PATENT DOCUMENTS

CN    101277103    10/2008
EP     1841230     10/2007
(Continued)

OTHER PUBLICATIONS

Chujoh et al., "Block-based Adaptive Loop Filter" ITU Telecommunications Standardization Sector, Study Group 16, 35th Meeting: Berlin, Germany, Jul. 16-18, 2008.
(Continued)

*Primary Examiner* — Behrooz Senfi
(74) *Attorney, Agent, or Firm* — Robert D. Shedd; Julia A. Tanase

(57) ABSTRACT

Methods and apparatus are provided for efficient adaptive filtering for video encoders and decoders. An apparatus includes a video encoder for encoding picture data for at least a portion of a picture using adaptive filtering. The video encoder includes an adaptive filter for performing the adaptive filtering. A final filter coefficient set used for the adaptive filtering is determined by iteratively estimating a plurality of filter coefficient sets and selecting a last estimated one of the plurality of filter coefficient sets as the final filter coefficient set when a last iteration corresponding to the last estimated one of the plurality of filter coefficient sets results in a quality improvement above a threshold value for the portion.

23 Claims, 10 Drawing Sheets

(51) Int. Cl.

| | |
|---|---|
| *H04N 19/85* | (2014.01) |
| *H04N 19/176* | (2014.01) |
| *H04N 19/70* | (2014.01) |
| *H04N 19/147* | (2014.01) |
| *H04N 19/172* | (2014.01) |
| *H04N 19/46* | (2014.01) |
| *H04N 19/61* | (2014.01) |
| *H04N 19/17* | (2014.01) |
| *H04N 19/192* | (2014.01) |
| *H04N 19/82* | (2014.01) |

(52) U.S. Cl.
CPC .............. *H04N 19/17* (2014.11); *H04N 19/172* (2014.11); *H04N 19/176* (2014.11); *H04N 19/192* (2014.11); *H04N 19/46* (2014.11); *H04N 19/61* (2014.11); *H04N 19/70* (2014.11); *H04N 19/82* (2014.11)

(56) References Cited

U.S. PATENT DOCUMENTS

| | | | |
|---|---|---|---|
| 8,402,074 B2 | 3/2013 | Eitel | |
| 2004/0062310 A1* | 4/2004 | Xue et al. | 375/240.16 |
| 2008/0267477 A1* | 10/2008 | Conti et al. | 382/131 |
| 2010/0014763 A1 | 1/2010 | Wittmann et al. | |
| 2010/0074330 A1* | 3/2010 | Fu et al. | 375/240.12 |
| 2010/0322303 A1 | 12/2010 | Wada et al. | |

FOREIGN PATENT DOCUMENTS

| | | |
|---|---|---|
| WO | WO2007111292 | 10/2007 |
| WO | WO2008075247 | 6/2008 |
| WO | WO2009110160 | 9/2009 |

OTHER PUBLICATIONS

Chujoh et al., "Specification and Experimental Results of Quadtree-based Adaptive Loop Filter" ITU Telecommunications Standardization Secotor, Study Group 16, 37th Meeting: Kawaseki, Japan, Apr. 15-18, 2009.

Dong, J. et al: "An Iterative Method for Frame-Level Adaptive Wiener Interpolation Filters in Video Coding", 2006 IEEE Workshop on Signal Processing Systems & Design Implementation, Banff, Canada Oct. 2-4, 2006.

Chujoh, T. et al: "Adaptive Loop Filter for Improving Coding Efficiency", Telecommunication Standardization Sector, Study Period 2005-2008, Study Group 16, COM 16-C-402-E; Apr. 2008.

Chujoh, T. et al: "Quadtree-based adaptive loop filter", Telecommunication Standardization Sector, Study Period 2009-2012, Study Group 16, COM 16-C-181-E, Jan. 2009.

Karczewicz. M. et al: "Post-filter with reduced delay requirements", Telecommunication Standardization Sector, Study Period 2009-2012, Study Group 16, COM-16, C-128-E, Jan. 2009.

Ichigaya, A. et al: "Description of Video Coding Rechnology Proposal by NHK and Mitsubishi", JCT-VC Meeting: ITU-T SG-16 WP3 & ISO/IEC JTC1/SC29/WG11, Dresden, DE, Apr. 15-23, 2010.

Li, X et al: "Patch-Based Video Processing: A Variational Bayesian Approach", IEEE Transactions on Circuits & Systems for Video Technology, vol. 19, No. 1, Jan. 2009.

Tanizawa, A. et al: "Improvement of Adaptive Quantization Matrix Selection", Telecommunication Standardization Sector, Study Group 16, Quest 6, 35th Meeting Berlin, Germany Jul. 16-18, 2008.

ITU-T Telecommunication Standardization Sector of ITU; Advanced Video Coding for Genric Audio Visual Services; Series H: AV and Multimedia Systems, H.264, Mar. 2005.

Search Report dated Apr. 11, 2011.

* cited by examiner

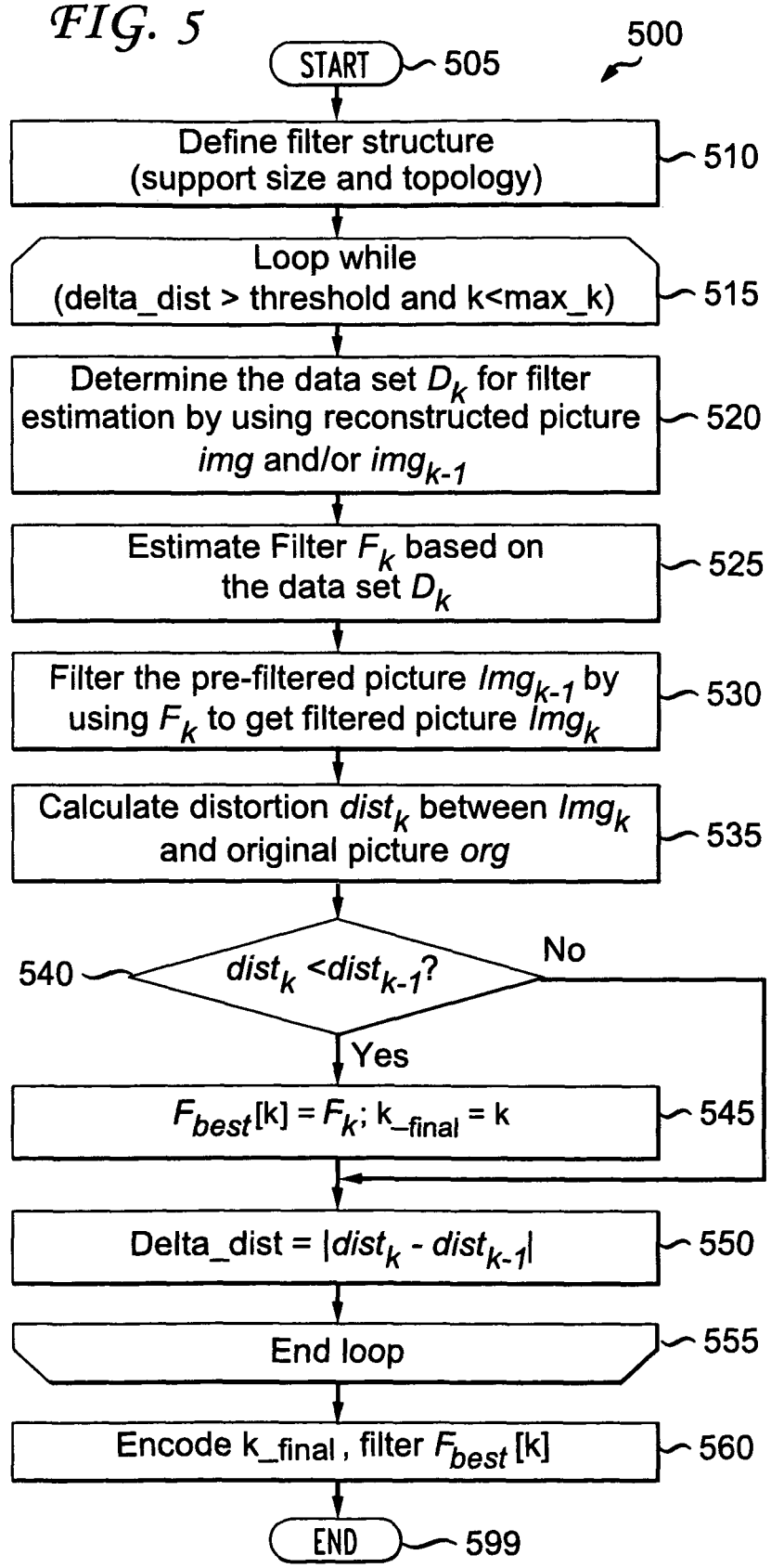

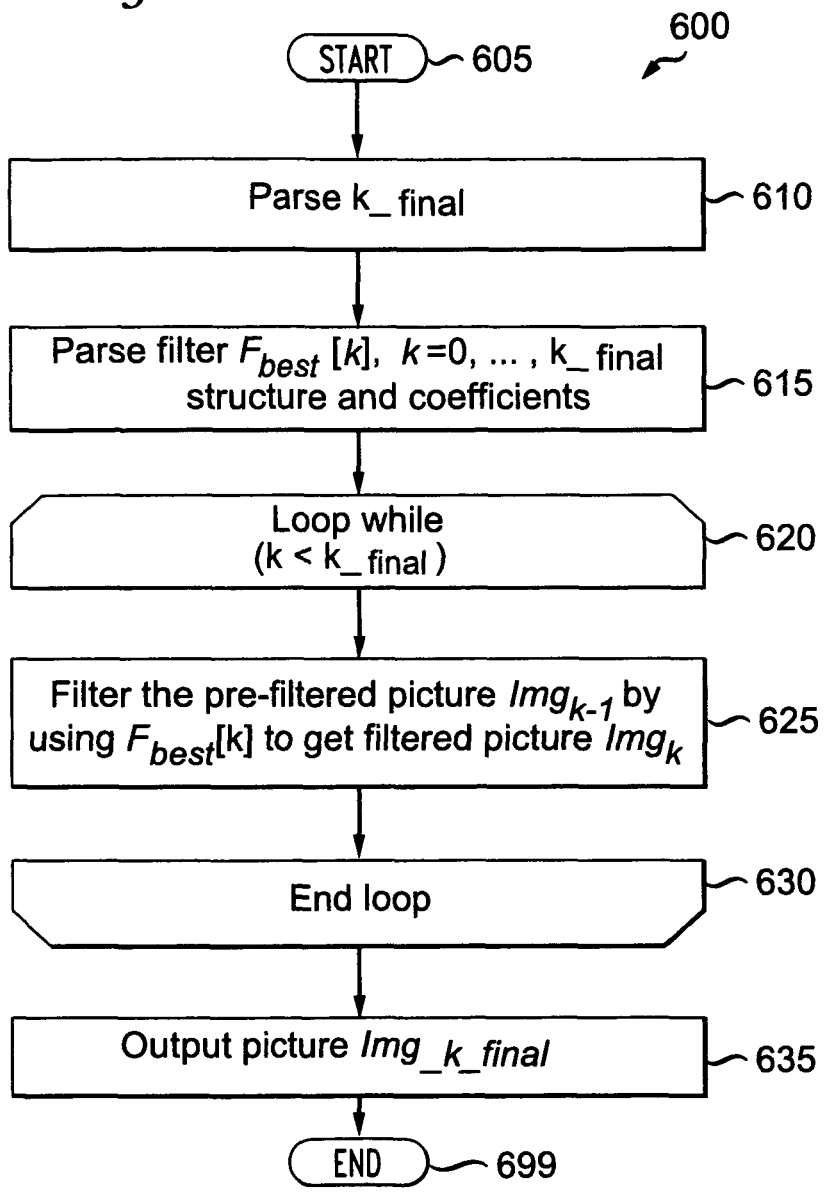

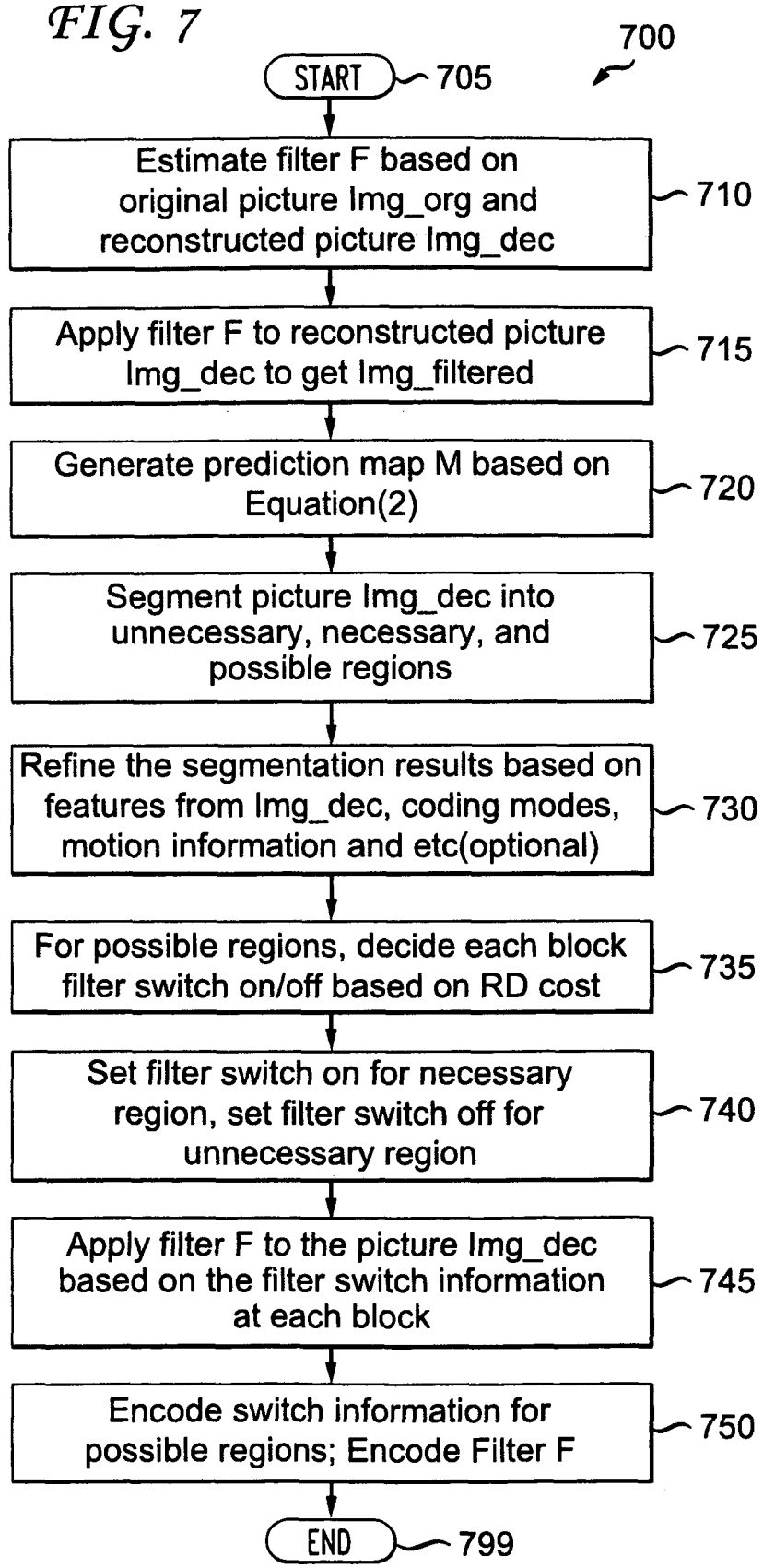

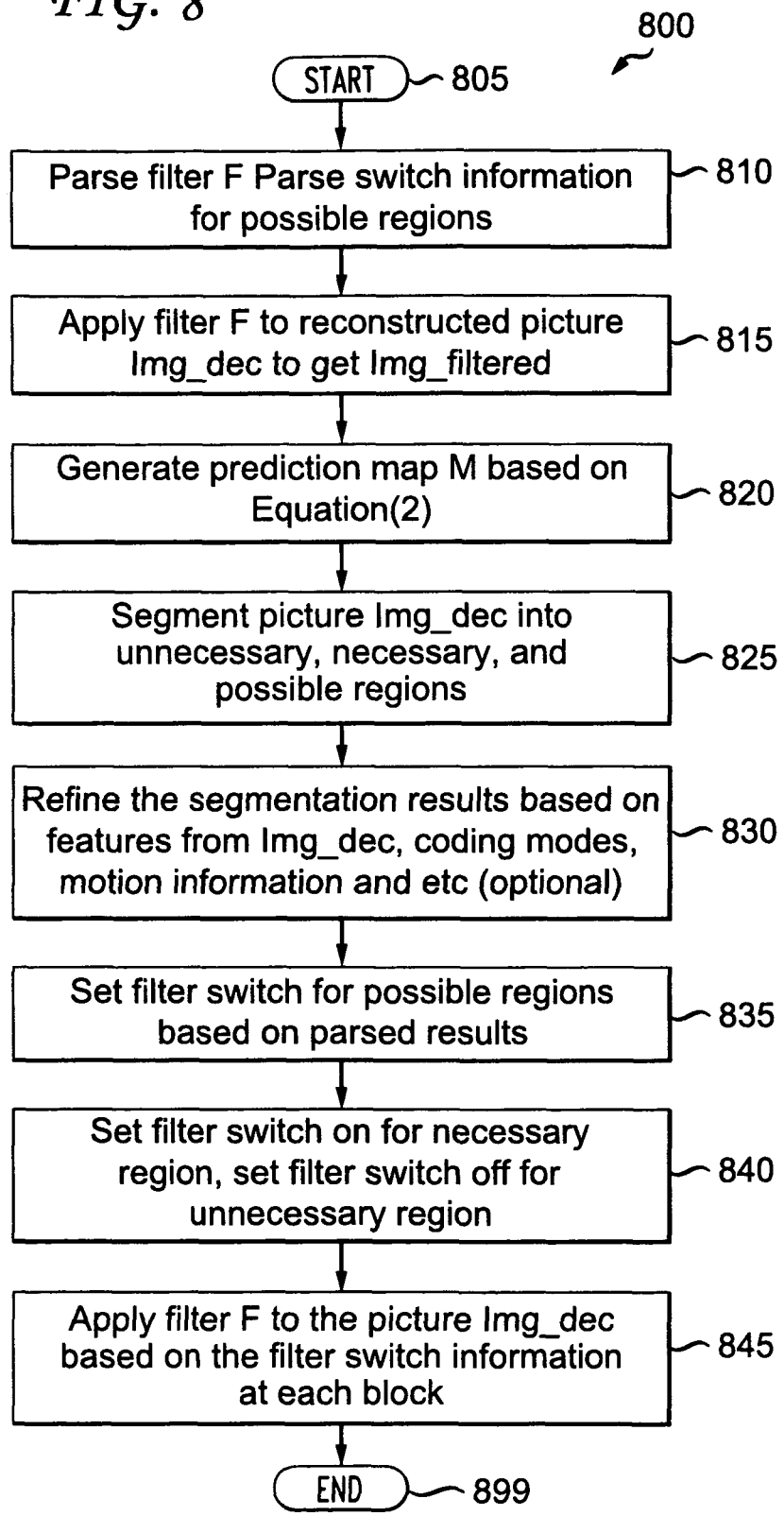

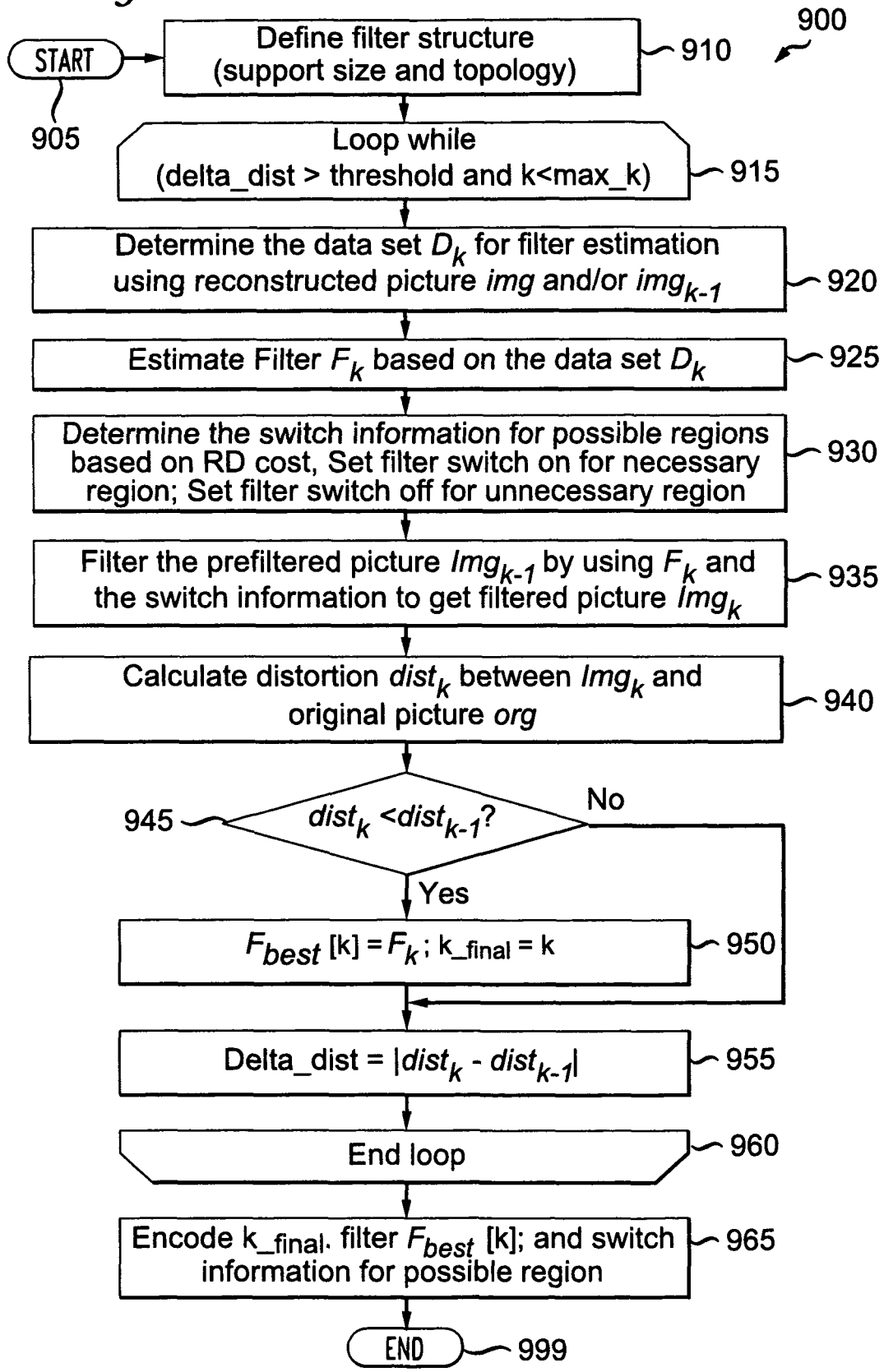

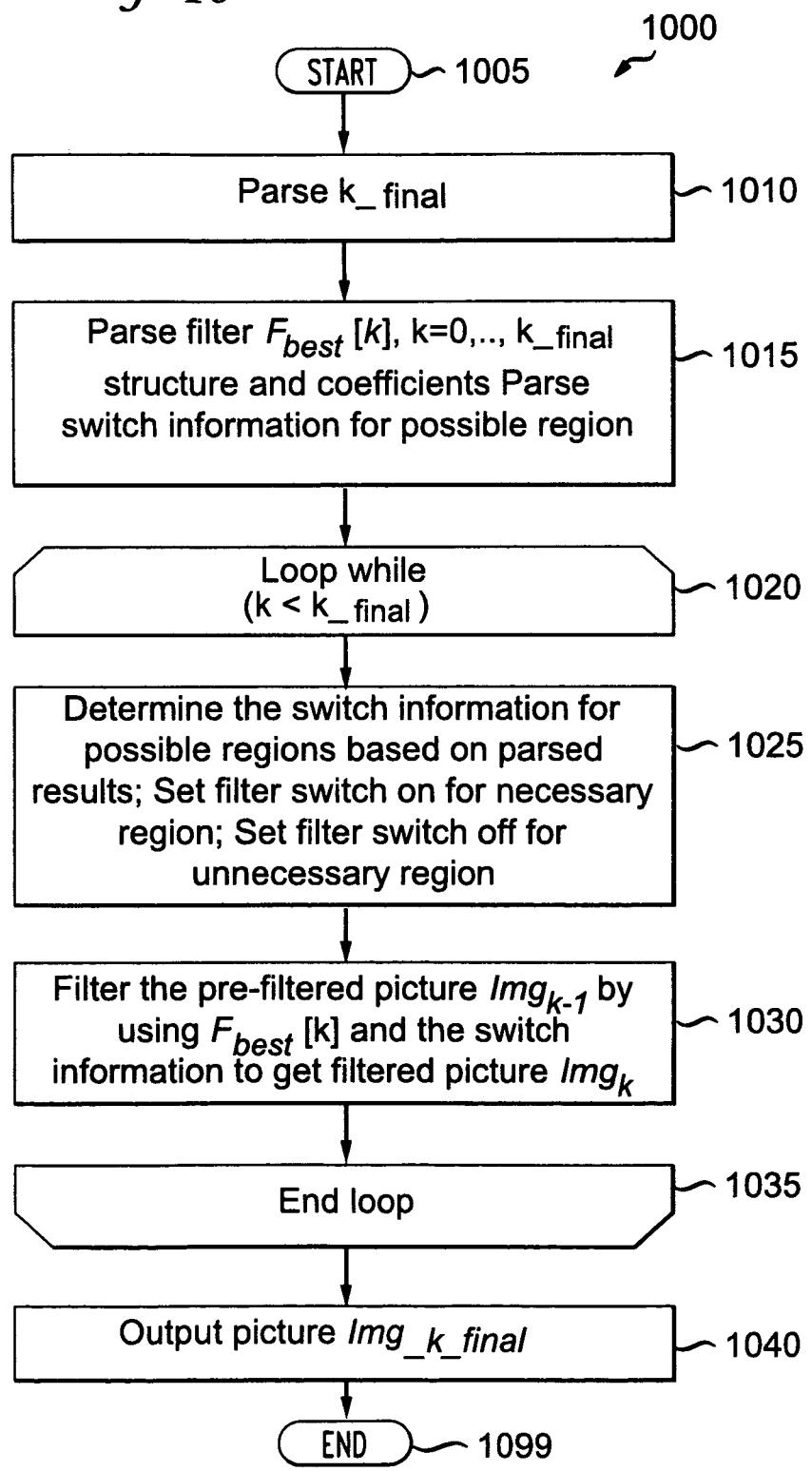

METHODS AND APPARATUS FOR EFFICIENT ADAPTIVE FILTERING FOR VIDEO ENCODERS AND DECODERS

CROSS-REFERENCE TO RELATED APPLICATIONS

This application claims the benefit, under 35 U.S.C. §365 of International Application PCT/US2010/002759, filed Oct. 15, 2010 which was published in accordance with PCT Article 21(2) on Apr. 21, 2011 in English and which claims the benefit of U.S. provisional patent application No. 61/251,934 filed Oct. 15, 2009

TECHNICAL FIELD

The present principles relate generally to video encoding and decoding and, more particularly, to methods and apparatus for efficient adaptive filtering for video encoders and decoders.

BACKGROUND

In hybrid video coding frameworks, filtering techniques are typically used for removing compression artifacts or for anti-aliasing. Such filtering techniques can be used in-loop or out-of-loop in many video compression applications. Due to the non-stationary nature of video signals, the filtering processes are expected to be adaptive in both spatial and temporal domains. Recently, many adaptive filtering schemes have been proposed to target and better restore coded pictures in order to improve coding efficiency.

Video coding standards employ block-based transforms (e.g., discrete cosine transforms (DCTs)) and motion compensation to achieve compression efficiency. Due to the lossy-compression property of the framework, the quality of the reconstructed videos is degraded. In the International Organization for Standardization/International Electrotechnical Commission (ISO/IEC) Moving Picture Experts Group-4 (MPEG-4) Part 10 Advanced Video Coding (AVC) Standard/International Telecommunication Union, Telecommunication Sector (ITU-T) H.264 Recommendation (hereinafter the "MPEG-4 AVC Standard"), a deblocking filter is applied to the decoded picture for removing blocky artifacts. In the Key Technology Area (KTA) of the MPEG-4 AVC Standard, Wiener filters are used in-loop or out-of-loop to improve the quality of decoded pictures. To achieve temporal adaptation, a Wiener filter is usually estimated for each picture by minimizing the mean square error between the original picture and the decoded picture at the encoder. The filter coefficients are sent to the decoder (in the bitstream or on the conveying media) as overhead for each picture. To achieve spatial adaptation, a picture can be divided into many regions. In each region, a switch controls whether the filtering process is "on" or "off". The region partition information and a switch control message are sent to the decoder as side information. However, the cost for sending this side information is high and not affordable in some cases, especially in many low bitrate but high resolution applications.

Furthermore, without any constraint on the data set for filter estimation, there are often outliers in the data set used in the estimation of the filter. The Wiener filter estimated by minimizing the mean square error of the data set is usually sub-optimal (or far from optimal).

Post Filter in KTA

In the Key Technology Area (KTA) of the MPEG-4 AVC Standard, an adaptive post filter was proposed in a first prior art approach. The basic idea of the first prior art approach is to apply a Wiener filter to the decoded picture before display. The Wiener filter can be estimated for each picture by minimizing the mean square error (MSE) between the original picture and the decoded (i.e., reconstructed) picture at the encoder. In this case, the estimated filter coefficients are sent to the decoder as overhead. The whole picture is filtered with the estimated filter. In another case, a set of Wiener filters are trained offline, and transmitted to or stored at the decoder. During decoding, the picture is filtered pixel-wise. At each pixel, a filter is selected from the filter set based on the statistics of the surrounding pixels. In this technique, the filtering indicator does not cost any overhead. The filtering indicator can be derived by the decoded picture content. However, the model between the filtering indicator and the picture content is very difficult to build. In the first prior art approach, an offline training scheme is exploited to find the corresponding model between the filtering indicator and the local variance. Since training is highly dependent on the training set, the model trained with limited data will be inaccurate for more general video signals.

Adaptive Loop Filter in KTA

An adaptive loop filter was proposed in a second prior art approach. Similar to the post filtering performed with respect to the first prior art approach described above, the Wiener filter is estimated for each picture by minimizing the mean square error (MSE) between the original picture and the decoded picture at the encoder. Since the Wiener filter is optimal in the sense of the mean square error of the whole picture, the quality of some regions can be degraded when applying the Wiener filter. To remove these pixels during filtering, a region based solution is proposed to achieve a trade-off between the overhead cost and coding performance. The second prior art approach indicates the regions where the Wiener filter is applied. The filter indicator is sent to the decoder as side information. By allowing different regions to have different block-sizes, a quad-tree-based flag can save bits by sending fewer bits in a large block-size region. All these methods require a block-based binary map to cover the entire frame.

SUMMARY

These and other drawbacks and disadvantages of the prior art are addressed by the present principles, which are directed to methods and apparatus for efficient adaptive filtering for video encoders and decoders.

According to an aspect of the present principles, there is provided an apparatus. The apparatus includes a video encoder for encoding picture data for at least a portion of a picture using adaptive filtering. The video encoder includes an adaptive filter for performing the adaptive filtering. A final filter coefficient set used for the adaptive filtering is determined by iteratively estimating a plurality of filter coefficient sets and selecting a last estimated one of the plurality of filter coefficient sets as the final filter coefficient set when a last iteration corresponding to the last estimated one of the plurality of filter coefficient sets results in a quality improvement above a threshold value for the portion.

According to another aspect of the present principles, there is provided a method in a video encoder. The method includes encoding picture data for at least a portion of a picture using adaptive filtering. A final filter coefficient set used for the adaptive filtering is determined by iteratively estimating a plurality of filter coefficient sets and selecting a last estimated one of the plurality of filter coefficient sets as the final filter coefficient set when a last iteration corresponding to the last estimated one of the plurality of filter coefficient sets results in a quality improvement above a threshold value for the portion.

According to still another aspect of the present principles, there is provided an apparatus. The apparatus includes a video decoder for decoding picture data for at least a portion of an input picture. The video decoder includes an iterative filter for iteratively filtering a reconstructed version of the picture using a plurality of filter coefficient sets to obtain an output version of the input picture.

According to yet another aspect of the present principles, there is provided a method in a video decoder. The method includes decoding picture data for at least a portion of an input picture. The video decoder includes an iterative filter for iteratively filtering a reconstructed version of the picture using a plurality of filter coefficient sets to obtain an output version of the input picture.

According to still yet another aspect of the present principles, there is provided an apparatus. The apparatus includes a video encoder for encoding picture data for at least a portion of a picture using adaptive filtering. The video encoder includes an adaptive filter for performing the adaptive filtering. At least a filter coefficient set for the adaptive filtering and filtering switch information for one of enabling or disabling the adaptive filtering are implicitly indicated using an implicit region indicating approach that respectively specifies one or more regions in the picture as certain candidates; certain non-candidates, and possible candidates for the adaptive filtering.

According to an additional aspect of the present principles, there is provided a method in a video encoder. The method includes encoding picture data for at least a portion of a picture using adaptive filtering. At least a filter coefficient set for the adaptive filtering and filtering switch information for one of enabling or disabling the adaptive filtering are implicitly indicated using an implicit region indicating approach that respectively specifies one or more regions in the picture as certain candidates, certain non-candidates, and possible candidates for the adaptive filtering.

According to a still additional aspect of the present principles, there is provided an apparatus. The apparatus includes a video decoder for decoding picture data for at least a portion of a picture using adaptive filtering. The video decoder includes an adaptive filter for performing the adaptive filtering. At least a filter coefficient set for the adaptive filtering and filtering switch information for one of enabling or disabling the adaptive filtering are implicitly indicated using an implicit region indicating approach that respectively specifies one or more regions in the picture as certain candidates, certain non-candidates, and possible candidates for the adaptive filtering.

According to a yet additional aspect of the present principles, there is provided a method in a video decoder. The method includes decoding picture data for at least a portion of a picture using adaptive filtering. The video decoder includes an adaptive filter for performing the adaptive filtering. At least a filter coefficient set for the adaptive filtering and filtering switch information for one of enabling or disabling the adaptive filtering are implicitly indicated using an implicit region indicating approach that respectively specifies one or more regions in the picture as certain candidates, certain non-candidates, and possible candidates for the adaptive filtering.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which:

FIG. 5 is a flow diagram showing another exemplary method for adaptively and iteratively filtering picture data in a video encoder, in accordance with an embodiment of the present principles;

FIG. 6 is a flow diagram showing another exemplary method for adaptively and iteratively filtering picture data in a video decoder, in accordance with an embodiment of the present principles;

FIG. 7 is a flow diagram showing an exemplary method for adaptively filtering picture data with implicit filtering signaling in a video encoder, in accordance with an embodiment of the present principles;

FIG. 8 is a flow diagram showing an exemplary method for adaptively filtering picture data with implicit filtering signaling in a video decoder, in accordance with an embodiment of the present principles;

FIG. 9 is a flow diagram showing an exemplary method for adaptively and iteratively filtering picture data with implicit filtering signaling in a video encoder, in accordance with an embodiment of the present principles; and FIG. 10 is a flow diagram showing an exemplary method for adaptively and iteratively filtering picture data with implicit filtering signaling in a video decoder, in accordance with an embodiment of the present principles.

DETAILED DESCRIPTION

Figure 1:
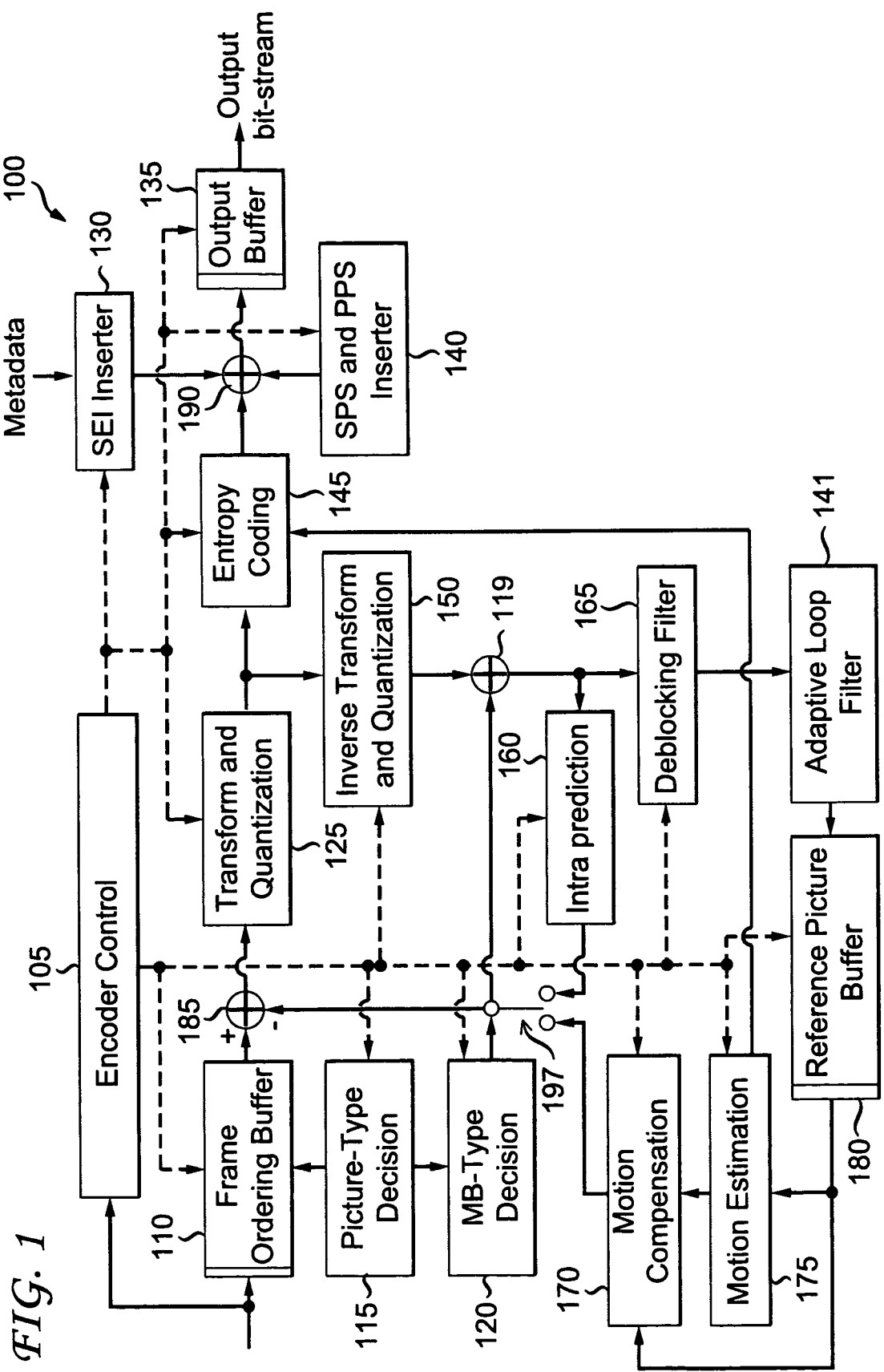
FIG. 1 is a block diagram showing an exemplary video encoder to which the present principles, in accordance with an embodiment of the present principles.

The present principles are directed to methods and apparatus for efficient adaptive filtering for video encoders and decoders. The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Also, as used herein, the words "picture" and "image" are used interchangeably and refer to a still image or a picture from a video sequence. As is known, a picture may be a frame or a field.

As noted above, we disclose methods and apparatus for efficient adaptive filtering for video encoders and decoders. For purposes of illustration and description, examples are described herein in the context of improvements over the MPEG-4 AVC Standard, using the MPEG-4 AVC Standard as the baseline for our description and explaining the improvements and extensions beyond the MPEG-4 AVC Standard. However, it is to be appreciated that the present principles are not limited solely to the MPEG-4 AVC Standard and/or extensions thereof. Given the teachings of the present principles provided herein, one of ordinary skill in this and related arts would readily understand that the present principles are equally applicable and would provide at least similar benefits when applied to extensions of other standards, or when applied and/or incorporated within standards not yet developed. It is to be further appreciated that the present principles also apply to video encoders and video decoders that do not conform to standards, but rather confirm to proprietary definitions.

Also, for illustrative purposes, the present principles are described in the context of an adaptive loop filter (ALF). However, it is to be appreciated that the present principles are not limited solely to adaptive loop filters and can be readily applied to other types of filters, including in-loop and out-of-loop applications, as readily understood by one of ordinary skill in this and related arts, given the teachings of the present principles provided herein.

Moreover, it is to be appreciated that all of the processes described in conjunction with the present principles can be applied for luminance, chrominance, or a combination of luminance and chrominance.

Turning to FIG. 1, an exemplary video encoder to which the present principles may be applied is indicated generally by the reference numeral 100. The video encoder 100 includes a frame ordering buffer 110 having an output in signal communication with a non-inverting input of a combiner 185. An output of the combiner 185 is connected in signal communication with a first input of a transformer and quantizer 125. An output of the transformer and quantizer 125 is connected in signal communication with a first input of an entropy coder 145 and a first input of an inverse transformer and inverse quantizer 150. An output of the entropy coder 145 is connected in signal communication with a first non-inverting input of a combiner 190. An output of the combiner 190 is connected in signal communication with a first input of an output buffer 135.

A first output of an encoder controller 105 is connected in signal communication with a second input of the frame ordering buffer 110, a second input of the inverse transformer and inverse quantizer 150, an input of a picture-type decision module 115, a first input of a macroblock-type (MB-type) decision module 120, a second input of an intra prediction module 160, a second input of a deblocking filter 165, a first input of a motion compensator 170, a first input of a motion estimator 175, and a second input of a reference picture buffer 180.

A second output of the encoder controller 105 is connected in signal communication with a first input of a Supplemental Enhancement Information (SEI) inserter 130, a second input of the transformer and quantizer 125, a second input of the entropy coder 145, a second input of the output buffer 135, and an input of the Sequence Parameter Set (SPS) and Picture Parameter Set (PPS) inserter 140.

An output of the SEI inserter 130 is connected in signal communication with a second non-inverting input of the combiner 190.

A first output of the picture-type decision module 115 is connected in signal communication with a third input of the frame ordering buffer 110. A second output of the picture-type decision module 115 is connected in signal communication with a second input of a macroblock-type decision module 120.

An output of the Sequence Parameter Set (SPS) and Picture Parameter Set (PPS) inserter 140 is connected in signal communication with a third non-inverting input of the combiner 190.

An output of the inverse quantizer and inverse transformer 150 is connected in signal communication with a first non-inverting input of a combiner 119. An output of the combiner 119 is connected in signal communication with a first input of the intra prediction module 160 and a first input of the deblocking filter 165. An output of the deblocking filter 165 is connected in signal communication with an input of an adaptive loop filter 141. An output of the adaptive loop filter 141 is connected in signal communication with a first input of a reference picture buffer 180. An output of the reference picture buffer 180 is connected in signal communication with a second input of the motion estimator 175 and a third input of the motion compensator 170. A first output of the motion estimator 175 is connected in signal communication with a second input of the motion compensator 170. A second output of the motion estimator 175 is connected in signal communication with a third input of the entropy coder 145.

An output of the motion compensator 170 is connected in signal communication with a first input of a switch 197. An output of the intra prediction module 160 is connected in signal communication with a second input of the switch 197. An output of the macroblock-type decision module 120 is connected in signal communication with a third input of the switch 197. The third input of the switch 197 determines whether or not the "data" input of the switch (as compared to the control input, i.e., the third input) is to be provided by the motion compensator 170 or the intra prediction module 160. The output of the switch 197 is connected in signal communication with a second non-inverting input of the combiner 119 and an inverting input of the combiner 185.

A first input of the frame ordering buffer 110 and an input of the encoder controller 105 are available as inputs of the encoder 100, for receiving an input picture. Moreover, a second input of the Supplemental Enhancement Information (SEI) inserter 130 is available as an input of the encoder 100, for receiving metadata. An output of the output buffer 135 is available as an output of the encoder 100, for outputting a bitstream.

Figure 2:
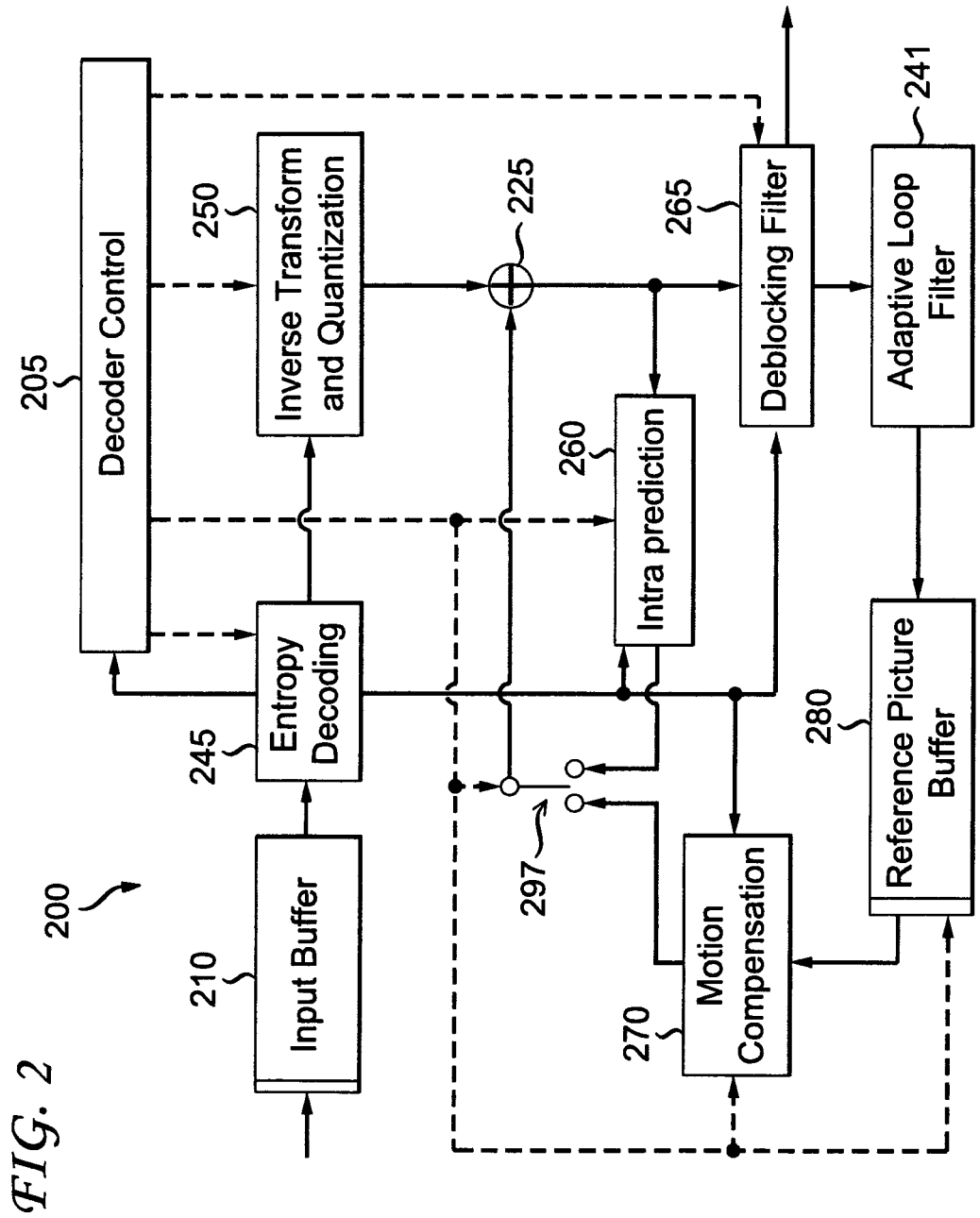
FIG. 2 is a block diagram showing an exemplary video decoder to which the present principles, in accordance with an embodiment of the present principles.

Turning to FIG. 2, an exemplary video decoder to which the present principles may be applied is indicated generally by the reference numeral 200. The video decoder 200 includes an input buffer 210 having an output connected in signal communication with a first input of an entropy decoder 245. A first output of the entropy decoder 245 is connected in signal communication with a first input of an inverse transformer and inverse quantizer 250. An output of the inverse transformer and inverse quantizer 250 is connected in signal communication with a second non-inverting input of a combiner 225. An output of the combiner 225 is connected in signal communication with a second input of a deblocking filter 265 and a first input of an intra prediction module 260. A second output of the deblocking filter 265 is connected in signal communication with an input of an adaptive loop filter 241. An output of the adaptive loop filter 241 is connected in signal communication with a first input of a reference picture buffer 280. An output of the reference picture buffer 280 is connected in signal communication with a second input of a motion compensator 270.

A second output of the entropy decoder 245 is connected in signal communication with a third input of the motion compensator 270, a first input of the deblocking filter 265, and a third input of the intra predictor 260. A third output of the entropy decoder 245 is connected in signal communication with an input of a decoder controller 205. A first output of the decoder controller 205 is connected in signal communication with a second input of the entropy decoder 245. A second output of the decoder controller 205 is connected in signal communication with a second input of the inverse transformer and inverse quantizer 250. A third output of the decoder controller 205 is connected in signal communication with a third input of the deblocking filter 265. A fourth output of the decoder controller 205 is connected in signal communication with a second input of the intra prediction module 260, a first input of the motion compensator 270, and a second input of the reference picture buffer 280.

An output of the motion compensator 270 is connected in signal communication with a first input of a switch 297. An output of the intra prediction module 260 is connected in signal communication with a second input of the switch 297. An output of the switch 297 is connected in signal communication with a first non-inverting input of the combiner 225.

An input of the input buffer 210 is available as an input of the decoder 200, for receiving an input bitstream. A first output of the deblocking filter 265 is available as an output of the decoder 200, for outputting an output picture.

As noted above, the present principles are directed to methods and apparatus for efficient adaptive filtering for video encoders and decoders.

In a first aspect of the present principles, we disclose methods and apparatus that iteratively refine the Wiener filter and the corresponding filtering of decoded pictures in order to achieve optimal restoration. Regarding embodiments directed to the first aspect, spatial adaptation is obtained by paying more overhead bits to define the regions and filter switch control information.

However, as previously described, the cost for sending side information (e.g., to define the regions and filter switch control information) may not be affordable in some cases, especially in low bitrate applications. Thus, in a second aspect of the present principles, we disclose methods and apparatus to derive the side information based on the available or decoded information at the decoder. Such an approach can reduce or eliminate the additional cost for sending side information, which thereby improves the coding performance.

Iterative Filtering

As noted above and in the accordance with the present principles, we disclose a first aspect thereof in which an iterative filtering process is used to improve the performance of the Wiener filter in video compression (as would be realized by one of ordinary skill in this and related arts, the present principles also apply to filtering methods that involve a filter(s) other than a Wiener filter). More specifically, we first define the filter structure such as, for example, the filter support size and topology. We then define a data set which is used to estimate the filter. The data set can be defined using any prior information of reconstructed video signals. Then, we can use the defined data set to estimate the filter coefficients and, hence, obtain an estimated filter. After we obtain the estimated filter, we can apply the estimated filter to the reconstructed picture in order to get a filtered picture. At this point, the first iteration has been completed. In the next iteration, we refine the data set that is used to estimate the filter by using the filtered picture, which is expected to be better than the picture used in the previous iteration. Then we can estimate the filter coefficients based on this refined data set. The estimated filter is then applied to the reconstructed pictures. When the improvement of the picture quality is small enough, that is, the improvement falls below a threshold value, then the iteration converges and can be stopped. The final estimated filter is an optimal one and the parameters of the determined filter will be sent to the decoder (in the bitstream, in the conveying media, and/or so forth). In an embodiment, the filter structure can be different in different iterations. In an embodiment, multiple filters can be used for each picture in each iteration.

In one embodiment, the estimated filter is only applied to the reconstructed picture. Then only the final estimated filter is sent to the decoder. The location of the pixel data that is used for the estimation of the filter is refined based on the filtered picture in each iteration. The value of the pixel in the data set is obtained from the reconstructed picture. The filter is only applied to the reconstructed picture. This strategy reduces the overhead sent.

Figure 3:
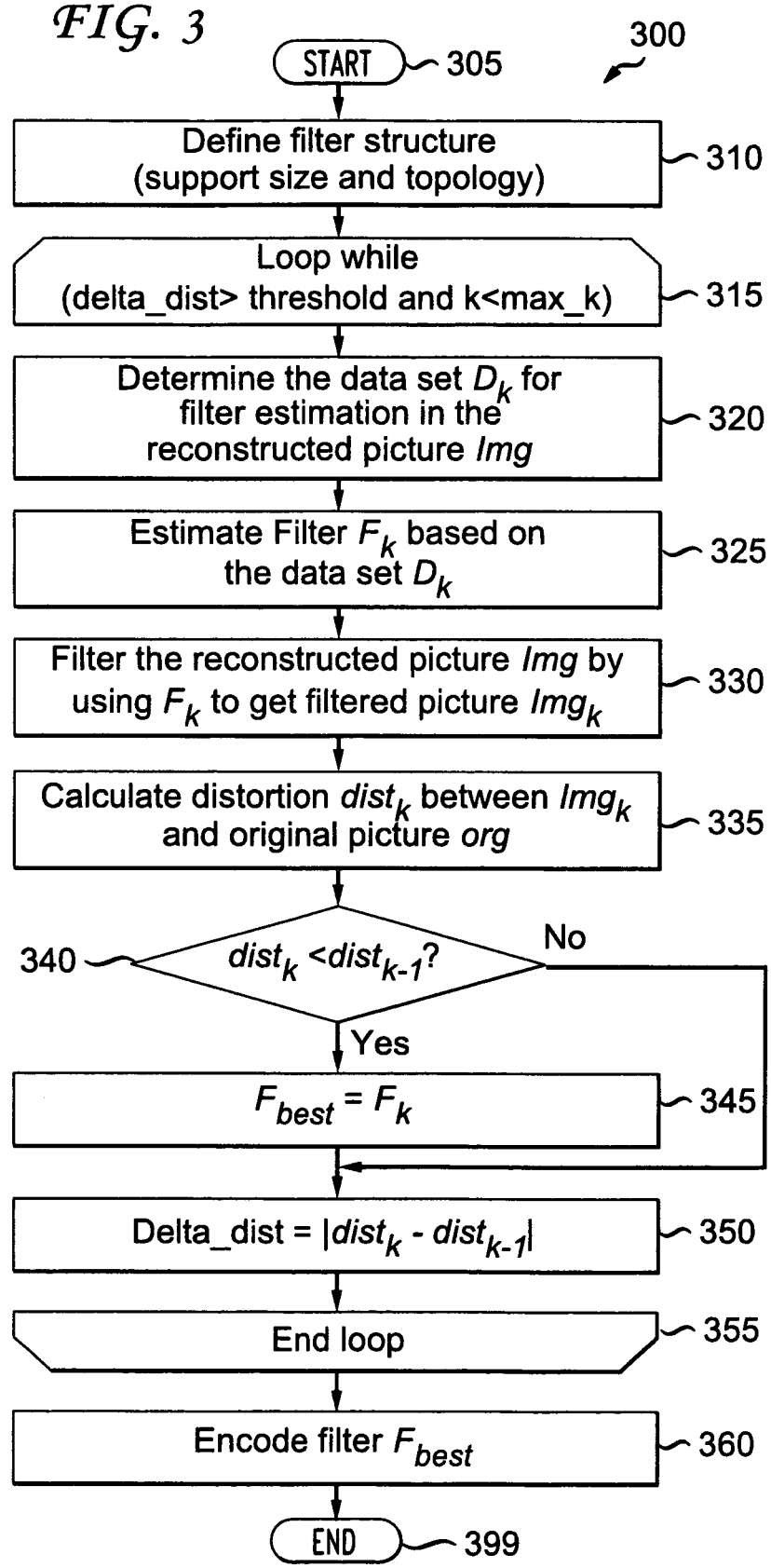
FIG. 3 is a flow diagram showing an exemplary method for adaptively and iteratively filtering picture data in a video encoder, in accordance with an embodiment of the present principles.

Turning to FIG. 3, an exemplary method for adaptively and iteratively filtering picture data in a video encoder is indicated generally by the reference numeral 300. The method 300 includes a start block 305 that passes control to a function block 310. The function block 310 defines a filter structure (e.g., support size and topology), and passes control to a loop limit block 315. The loop limit block 315 begins a loop while (delta_dist>threshold and K<max_K), and passes control to a function block 320. The function block 320 determines the data set $D_k$ for the filter estimation in the reconstructed picture Img, and passes control to a function block 325. The function block 325 estimates filter $F_k$ based on the data set $D_k$, and passes control to a function block 330. The function block 330 filters the reconstructed picture Img by using $F_k$ to get filtered picture $Img_k$, and passes control to a function block 335. The function block 335 calculates the distortion $dist_k$ between $Img_k$ and the original picture org, and passes control to a decision block 340. The decision block 340 determines whether or not $dist_k<dist_{k-1}$. If so, then control is passed to a function block 345. Otherwise, control is passed to a function block 350. The function block 345 sets $F_{best}=F_k$, and passes control to the function block 350. The function block 350 sets Delta_dist=|$dist_k-dist_{k-1}$|, and passes control to a loop limit block 355. The loop limit block 355 ends the loop, and passes control to a function block 360. The function block 360 encodes filter $F_{best}$, and passes control to an end block 399.

Figure 4:
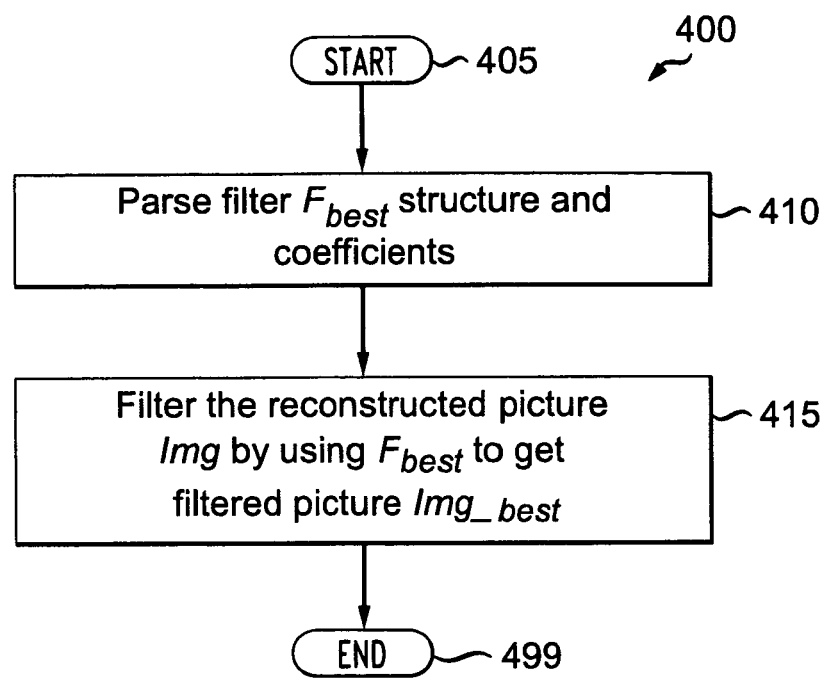
FIG. 4 is a flow diagram showing an exemplary method for adaptively and iteratively filtering picture data in a video decoder, in accordance with an embodiment of the present principles.

Turning to FIG. 4, an exemplary method for adaptively and iteratively filtering picture data in a video decoder is indicated generally by the reference numeral 400. The method 400 includes a start block 405 that passes control to a function block 410. The function block 410 parses a filter $F_{best}$ structure and coefficients, and passes control to a function block 415. The function block 415 filters the reconstructed picture Img by using $F_{best}$ to get filtered picture Img__best, and passes control to an end block 499.

In another embodiment, both the location and value of the pixels in the data set are determined from the filtered picture that is output from the previous iteration. The filter is estimated by using the filtered picture in the previous iteration. For each iteration, a filter is estimated and the picture is filtered at the encoder. The filter is continuously applied to the previous iteration filtered picture. All the estimated filters in the iteration are required to be sent to the decoder. At the decoder, the decoded picture is also filtered iteratively by applying the received estimated filters.

Turning to FIG. 5, another exemplary method for adaptively and iteratively filtering picture data in a video encoder is indicated generally by the reference numeral 500. The method 500 includes a start block 505 that passes control to a function block 510. The function block 510 defines a filter structure (e.g., support size and topology), and passes control to a loop limit block 515. The loop limit block 515 begins a loop while (delta_dist>threshold and K<max_K), and passes control to a function block 520. The function block 520 determines the data set $D_k$ for the filter estimation by using reconstructed picture Img and/or $Img_{k-1}$, and passes control to a function block 525. The function block 525 estimates filter $F_k$ based on the data set $D_k$, and passes control to a function block 530. The function block 530 filters the pre-filtered picture $Img_{k-1}$ by using $F_k$ to get filtered picture $Img_k$, and passes control to a function block 535. The function block 535 calculates the distortion $dist_k$ between $Img_k$ and the original picture org, and passes control to a decision block 540. The decision block 540 determines whether or not $dist_k<dist_{k-1}$. If so, then control is passed to a function block 545. Otherwise, control is passed to a function block 550. The function block 345 sets $F_{best}[k]=F_k$, k__final=k, and passes control to the function block 550. The function block 550 sets Delta_dist=|$dist_k-dist_{k-1}$|, and passes control to a loop limit block 555. The loop limit block 555 ends the loop, and passes control to a function block 560. The function block 560 encodes k__final and filter $F_{best}[k]$, and passes control to an end block 599.

Turning to FIG. 6, another exemplary method for adaptively and iteratively filtering picture data in a video decoder is indicated generally by the reference numeral 600. The method 600 includes a start block 605 that passes control to a function block 610. The function block 610 parses k__final, and passes control to a function block 615. The function block 615 parses filter $F_{best}[k]$, structure, and coefficients, where k=0, . . . , k__final, and passes control to a loop limit block 620. The loop limit block 620 begins a loop while (k<k__final), and passes control to a function block 625. The function block 625 filters the picture $Img_{k-1}$ by using $F_{best}[k]$ to get filtered picture $Img_k$, and passes control to a loop limit block 630. The loop limit block 630 ends the loop, and passes control to a function block 635. The function block 635 outputs picture Img__k__final, and passes control to an end block 699.

Implicit Filtering Signaling

In accordance with the present principles, we disclose a second aspect in which we reduce the required side information for region-based filtering by skipping the signaling bits for some regions. It has been observed that the pixel values in many regions have very few changes when filtered. Based on this observation that filtering does not impact these pixels, the present principles aim at spending very few bits related to the filter information (e.g., filter switch information) in these regions. We have also observed that the filter definitely does a good job in some regions (e.g., texture regions) while in some other regions the filter is relatively constant. For all these regions, we do not send the filter switch information or the filter information, since we can keep the information at the encoder and decoder fixed. More generally, in accordance with this aspect of the present principles, we propose first to detect these regions and then to skip (i.e., not transmit and/or otherwise not convey) side information for these regions.

In one embodiment, a filter is first applied on the entire reconstructed picture to create a filtered picture. The filtered picture and the reconstructed picture are then compared to detect these special regions. The unnecessary regions can be defined by a block or a region where the difference between the reconstructed frame and the filtered frame is smaller than some threshold. For example, a block R(X,Y) is an unnecessary region if the following applies:

$$\sum_{(i,j)\in R(X,Y)} M(i, j) < th\_unness \quad (1)$$

where (i,j) refer to a pixel location in a picture, th_unness is a threshold and can take on different values for different block sizes, and M(i,j) is the prediction map for pixel (i,j). M(i,j) is defined as follows:

$$M(i, j) = \begin{cases} 0 & \text{if } |\text{Img\_dec}(i, j) - \text{Img\_filtered}(i, j)| = 0 \\ 1 & \text{if } |\text{Img\_dec}(i, j) - \text{Img\_filtered}(i, j)| > 0 \end{cases} \quad (2)$$

where Img_dec is the frame before filtering and Img_filtered is the frame after filtering. If the summation of the predicted map value inside a region is smaller than a threshold, then the bits for that block are unnecessary and are skipped. Similarly, inside a Quad-tree sub-block level, the bit for a sub-block is also skipped if the prediction map value inside that sub-block is smaller than a threshold.

Similarly, the necessary regions can be defined by a block or a region where the difference between the reconstructed frame and the filtered frame is larger than some threshold. For example, a block R(X,Y) is a necessary region if the following applies:

$$\sum_{(i,j)\in R(X,Y)} M(i, j) > th\_ness \quad (3)$$

where (i,j) refer to a pixel location in a picture, and th_ness is a threshold and can take on different values for different block sizes.

The regions that do not belong to either unnecessary or necessary regions are defined as possible regions. We only need to send side information for those possible regions since those possible regions include most of the uncertainties. For the other two regions, we do not send any side information since unnecessary regions are not required to be filtered while necessary regions will definitely be filtered. It is to be appreciated that the regions or the blocks can have different sizes and topologies. It is to be further appreciated that the thresholds can also take on different values for different blocks or regions. All information that is required to do this region segmentation is available at both the encoder and decoder, since we just compare the reconstructed image and the filtered reconstructed image. Thus, we do not need to send additional overhead to the region segmentation.

In another embodiment, the reconstructed frame and the filtered frame are compared to get a coarse detection of the filtering regions. Then the coarse region detection is refined by incorporating more features from decoded pictures such as, for example, spatio-temporal local variance, compression modes, motion information, and so forth. The refined region detection provides the final segmentation. We send side information only for possible regions and not for necessary and unnecessary regions as they will be determined implicitly at the decoder.

Turning to FIG. 7, an exemplary method for adaptively filtering picture data with implicit filtering signaling in a video encoder is indicated generally by the reference numeral 700. The method 700 includes a start block 705 that passes control to a function block 710. The function block 710 estimates filter F based on an original picture Img_org and reconstructed picture Img_dec, and passes control to a function block 715. The function block 715 applies filter F to the reconstructed picture Img_dec to get Img_filtered, and passes control to a function block 720. The function block 720 generates prediction map M based on Equation (2), and passes control to a function block 725. The function block 725 segments picture Img_dec into unnecessary, necessary, and possible regions, and passes control to a function block 730. The function block 730 refines the segmentation results based on features from Img_dec, coding modes, motion information, and so forth, and passes control to a function block 735. The function block 735 renders a decision for each possible region regarding whether to not to switch each block filter "on" or "off" based on rate-distortion (RD) cost, and passes control to a function block 740. The function block 740 sets the filter switch to "on" for the necessary regions, sets the filter switch to "off" for the unnecessary regions, and passes control to a function block 745. The function block 745 applies filter F to the picture Img_dec based on the filter switch information at each block, and passes control to a function block 750. The function block 750 encodes switch information for possible regions, encodes filter F, and passes control to an end block 799.

Turning to FIG. 8, an exemplary method for adaptively filtering picture data with implicit filtering signaling in a video decoder is indicated generally by the reference numeral 800. The method 800 includes a start block 805 that passes control to a function block 810. The function block 810 parses filter F, parses witch information for possible regions, and passes control to a function block 815. The function block 815 applies filter F to the reconstructed picture Img_dec to get Img_filtered, and passes control to a function block 820. The function block 820 generates prediction map M based on Equation (2), and passes control to a function block 825. The function block 825 segments picture Img_dec into unnecessary, necessary, and possible regions, and passes control to a function block 830. The function block 830 refines the segmentation results based on features from Img_dec, coding modes, motion information, and so forth, and passes control to a function block 835. The function block 835 sets the filter switch for possible regions based on the parsed results, and passes control to a function block 840. The function block 840 sets the filter switch to "on" for the necessary regions, sets the filter switch to "off" for the unnecessary regions, and passes control to a function block 845. The function block 845 applies filter F to the picture Img_dec based on the filter switch information at each block, and passes control to an end block 899.

Combination of Iterative Filtering and Implicit Filtering Signaling

It is to be appreciated that two or more of the various embodiments proposed above can be combined to further improve performance. In an iterative filtering process, we need to define the data set for the filter estimation, so we can use the region detection technique in implicit filtering signaling for defining or refining the data set. The implicit filtering signaling technique can be used for each iteration or some iterations in the iterative filtering process.

In one embodiment, one iteration of the iterative filtering process is performed and an estimated filter and a filtered picture are output there from. Then, the filtered picture and the unfiltered picture (reconstructed picture) can be used to perform the region detection to segment the picture into necessary, unnecessary, and possible regions. In the next iteration, only the necessary and possible region pixels are incorporated into the data set for filter estimation. We keep iteratively filtering the picture and refining the filter estimation. When the quality of the filtered picture does not improve any more (e.g., below a threshold value), then the iteration process is ended.

Turning to FIG. 9, an exemplary method for adaptively and iteratively filtering picture data with implicit filtering signaling in a video encoder is indicated generally by the reference numeral 900. The method 900 includes a start block 905 that passes control to a function block 910. The function block 910 defines a filter structure (e.g., support size and topology), and passes control to a loop limit block 915. The loop limit block 915 begins a loop while (delta_dist>threshold and K<max_K), and passes control to a function block 920. The function block 920 determines the data set $D_k$ for the filter estimation by using reconstructed Img and/or $Img_{k-1}$, and passes control to a function block 925. The function block 925 estimates filter $F_k$ based on the data set $D_k$, and passes control to a function block 930. The function block 930 determines the switch information for the possible regions based on the rate-distortion (RD) cost, sets the filter switch to "on" for the necessary regions, sets the filter switch to "off" for the unnecessary regions, and passes control to a function block 935. The function block 935 filters the pre-filtered picture $Img_{k-1}$ by using $F_k$ and the switch information to get filtered picture $Img_k$, and passes control to a function block 940. The function block 940 calculates the distortion $dist_k$ between $Img_k$ and the original picture org, and passes control to a decision block 945. The decision block 945 determines whether or not $dist_k < dist_{k-1}$. If so, then control is passed to a function block 950. Otherwise, control is passed to a function block 955. The function block 950 sets $F_{best}[k]=F_k$, sets $k\_final=k$, and passes control to the function block 955. The function block 955 sets Delta_dist=|$dist_k-dist_{k-1}$|, and passes control to a loop limit block 960. The loop limit block 960 ends the loop, and passes control to a function block 965. The function block 965 encodes $k\_final$ and filter $F_{best}[k]$, and passes control to an end block 999.

Turning to FIG. 10, an exemplary method for adaptively and iteratively filtering picture data with implicit filtering signaling in a video decoder is indicated generally by the reference numeral 1000. The method 1000 includes a start block 1005 that passes control to a function block 1010. The function block 610 parses $k\_final$, and passes control to a function block 1015. The function block 1015 parses filter $F_{best}[k]$, structure, and coefficients, where k=0, . . . , $k\_final$, and passes control to a loop limit block 1020. The loop limit block 1020 begins a loop while (k<$k\_final$), and passes control to a function block 1025. The function block 1025 determines the switch information for possible regions based on the parsed results, sets the filter switch to "on" for the necessary regions, sets the filter switch to "off" for the unnecessary regions, and passes control to a function block 1030. The function block 1030 filters the picture $Img_{k-1}$ by using $F_{best}[k]$ and the switch information to get filtered picture $Img_k$, and passes control to a loop limit block 1035. The loop limit block 1035 ends the loop, and passes control to a function block 1040. The function block 1040 outputs picture $Img\_k\_final$, and passes control to an end block 1099.

Syntax

TABLE 1 shows exemplary picture and slice header syntax, in accordance with an embodiment of the present principles.

TABLE 1

| picture_header( ) { | Descriptor |
|---|---|
| ... | |
|   iterative_filtering_flag | u(1) |
|   implicit_filter_signal_flag | u(1) |
| ... | |
| } | |
| slice_header( ) { | |
| ... | |
|   if(iterative_filtering_flag ==1) { | |
|     k_final | u(v) |
|     for( k=0; k< k_final; k++) | |
|       for( j=0; j<filter_support_size; j++) | |
|         filter_coeff[k][j] | u(v) |
|   } | |
|   else{ | |
|     for( j=0; j<filter_support_size; j++) | |
|       filter_coeff[0][j] | u(v) |
|   } | |
|   if(implicit_filter_signal_flag ==1) { | |
|     for(i=0; i<blk_num_in_possible_regions; i++) | |
|       filter_switch[i] | u(1) |
|   } | |
|   else{ | |
|     for(i=0; i<blk_num_in_slice; i++) | |
|       filter_switch[i] | u(1) |
|   } | |
| .... | |
| } | |

The semantics of some of the syntax elements of TABLE 1 are as follows:

iterative_filtering_flag equal to 1 indicates that the iterative filtering process is enabled (used) for the picture. iterative_filtering_flag equal to 0 indicates that the iterative filtering process is disabled (not used) for the picture.

k_final specifies the number of iteration times of the iterative filtering process.

implicit_filter_signal_flag equal to 1 indicates that implicit filtering signaling is enabled for the picture. implicit_filter_signal_flag equal to 0 indicates that implicit filtering signaling is disabled for the picture.

filter_switch[i] equal to 1 specifies that the filter is on for region i; filter_switch[i] equal to 0 indicates that the filter is off for region i.

filter_coeff[k] [j] specifies filter coefficients for the picture at iteration k.

A description will now be given of some of the many attendant advantages/features of the present invention, some of which have been mentioned above. For example, one advantage/feature is an apparatus having a video encoder for encoding picture data for at least a portion of a picture using adaptive filtering. The video encoder includes an adaptive filter for performing the adaptive filtering. A final filter coefficient set used for the adaptive filtering is determined by iteratively estimating a plurality of filter coefficient sets and selecting a last estimated one of the plurality of filter coefficient sets as the final filter coefficient set when a last iteration corresponding to the last estimated one of the plurality of filter coefficient sets results in a quality improvement above a threshold value for the portion.

Another advantage/feature is the apparatus having the video encoder as described above, wherein a number of iterations used to determine the final set of filter coefficients is fixed.

Yet another advantage/feature is the apparatus having the video encoder as described above, wherein the adaptive filtering involves performing a plurality of iterations, and a same filter type is used for each of the plurality of iterations.

Still another advantage/feature is the apparatus having the video encoder as described above, wherein the plurality of filter coefficient sets are iteratively estimated on one of a global basis, a region basis, or a local basis.

Moreover, another advantage/feature is the apparatus having the video encoder as described above, wherein the adaptive filtering involves performing a plurality of iterations, and a plurality of filters are used in one or more of the plurality of iterations.

Further, another advantage/feature is the apparatus having the video encoder as described above, wherein the adaptive filter is utilized in at least one of an in-loop filtering configuration and an out-of-loop filtering configuration.

Also, another advantage/feature is an apparatus having a video encoder for encoding picture data for at least a portion of a picture using adaptive filtering. The video encoder includes an adaptive filter for performing the adaptive filtering. At least a filter coefficient set for the adaptive filtering and filtering switch information for one of enabling or disabling the adaptive filtering are implicitly indicated using an implicit region indicating approach that respectively specifies one or more regions in the picture as certain candidates, certain non-candidates, and possible candidates for the adaptive filtering.

Additionally, another advantage/feature is the apparatus having the video encoder as described above, wherein the picture is segmented to obtain the one or more regions.

Moreover, another advantage/feature is the apparatus having the video encoder wherein the picture is segmented to obtain the one or more regions as described above, wherein an identification of whether a particular region is one of the certain candidates, one of the certain non-candidates, or one of the possible candidates is determined by comparing a filtered frame and a reconstructed frame corresponding to the picture.

Further, another advantage/feature is the apparatus having the video encoder wherein the picture is segmented to obtain the one or more regions as described above, wherein an identification of whether a particular region is one of the certain candidates, one of the certain non-candidates, or one of the possible candidates is capable of being at least one of detected and refined using content features from at least one of a filtered frame and a reconstructed frame corresponding to the picture.

Also, another advantage/feature is the apparatus having the video encoder wherein the picture is segmented to obtain the one or more regions as described above, wherein an identification of whether a particular region is one of the certain candidates, one of the certain non-candidates, or one of the possible candidates is capable of being at least one of detected and refined using coding information corresponding to the picture.

Additionally, another advantage/feature is the apparatus having the video encoder wherein an identification of whether a particular region is one of the certain candidates, one of the certain non-candidates, or one of the possible candidates is capable of being at least one of detected and refined using coding information corresponding to the picture as described above, wherein the coding information comprises at least one of coding mode, motion information, picture type, and slice type.

Moreover, another advantage/feature is the apparatus having the video encoder wherein the picture is segmented to obtain the one or more regions as described above, wherein criteria used to segment the one or more regions is variable for at least one of different ones of the one or more regions and region boundaries.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising:
a video encoder configured to encode picture data for at least a portion of a picture using adaptive filtering,
wherein said video encoder includes an adaptive filter for performing the adaptive filtering, and
wherein a final filter coefficient set used for the adaptive filtering is determined by
iteratively estimating a plurality of filter coefficient sets by using data from a filtered picture to estimate a next filter coefficient set, the filtered picture filtered with a previously estimated filter coefficient set, and
selecting an estimated filter coefficient set based on a determination that the estimated filter coefficient set has a quality improvement above a threshold value for the portion which has been estimated; and
wherein only data from necessary regions and possible regions of said filtered picture are used to estimate a first filter coefficient set after the first estimation of the iterative estimation of the plurality of filter coefficient sets, and wherein said necessary and possible regions being determined using a reconstructed picture and a filtered picture.

2. In a video encoder, a method, comprising:
iteratively estimating a plurality of filter coefficient sets by using data from a filtered picture to estimate a next filter coefficient set, the filtered picture filtered with a previously estimated filter coefficient set;
selecting an estimated filter coefficient set as a final filter coefficient set for an adaptive filtering based on a determination that the filter coefficient set results in a quality improvement above a threshold value for the portion which has been estimated;
performing adaptive filtering using the final filter coefficient set for the adaptive filtering; and
encoding picture data for at least a portion of the picture,
wherein only data from necessary regions and possible regions of said filtered picture are used to estimate a first filter coefficient set after the first estimation of the iterative estimation of the plurality of filter coefficient sets, and wherein said necessary and possible regions being determined using a reconstructed picture and a filtered picture.

3. The method of claim 2, wherein a number of iterations used to determine the final set of filter coefficients is fixed.

4. The method of claim 2, wherein the adaptive filtering involves performing a plurality of iterations, and a same filter type is used for each of the plurality of iterations.

5. The method of claim 2, wherein the plurality of filter coefficient sets are iteratively estimated on one of a global basis, a region basis, or a local basis.

6. The method of claim 2, wherein the adaptive filtering involves performing a plurality of iterations, and a plurality of filters are used in one or more of the plurality of iterations.

7. The method of claim 2, wherein the adaptive filtering is utilized in at least one of an in-loop filtering configuration and an out-of-loop filtering configuration.

8. An apparatus, comprising:
a video decoder configured to decode picture data for at least a portion of an input picture, wherein said video decoder includes an iterative filter configured to iteratively filter a reconstructed version of the input picture using a plurality of filter coefficient sets, wherein said iterative filter applies received estimated filter-s to obtain an output version of the input picture; and
wherein only data from necessary and possible regions of said filtered picture was used to estimate a filter coefficient set of the iterative filter, where said necessary and possible regions were determined from parsing data encoded with said picture data.

9. In a video decoder, a method, comprising:
applying received estimated filters to an iterative filter;
iteratively filtering a reconstructed version of an input picture using a plurality of filter coefficient sets by the iterative filter;
decoding picture data for at least a portion of the input picture to obtain an output version of the input picture;
wherein only data from necessary and possible regions of said filtered picture was used to estimate a filter coefficient set of the iterative filter, where said necessary and possible regions were determined from parsing data encoded with said picture data.

10. The method of claim 9, wherein a number of iterations used to filter the reconstructed version of the input picture to obtain the output version of the input picture is fixed.

11. The method of claim 9, wherein the filtering involves performing a plurality of iterations, and a same filter type is used for each of the plurality of iterations.

12. The method of claim 9, wherein the adaptive filtering involves performing a plurality of iterations, and a plurality of filters are used in one or more of the plurality of iterations.

13. The method of claim 9, wherein the adaptive filtering is utilized in at least one of an in-loop filtering configuration and an out-of-loop filtering configuration.

14. A non-transitory computer readable storage media having non-transitory video signal data encoded thereupon, comprising:
picture data for at least a portion of a picture encoded using adaptive filtering, wherein a final filter coefficient set used for the adaptive filtering is determined by iteratively estimating a plurality of filter coefficient sets and wherein data from a filtered picture that is output from a previous iteration is used to estimate a filter coefficient set for a next iteration, and selecting an estimated one of the plurality of filter coefficient sets as the selected filter coefficient set when an iteration corresponding to the selected filter coefficient set results in a quality improvement above a threshold value for the portion; and
wherein only data from necessary and possible regions of said filtered picture are used to estimate filter coefficient set after the first iteration, said necessary and possible regions being determined using a reconstructed and filtered picture.

15. The apparatus of claim 1, wherein a number of iterations used to determine the final set of filter coefficients is fixed.

16. The apparatus of claim 1, wherein the adaptive filtering involves performing a plurality of iterations, and a same filter type is used for each of the plurality of iterations.

17. The apparatus of claim 1, wherein the plurality of filter coefficient sets are iteratively estimated on one of a global basis, a region basis, or a local basis.

18. The apparatus of claim 1, wherein the adaptive filtering involves performing a plurality of iterations, and a plurality of filters are used in one or more of the plurality of iterations.

19. The apparatus of claim 1, wherein the adaptive filtering is utilized in at least one of an in-loop filtering configuration and an out-of-loop filtering configuration.

20. The method of claim 9, wherein a number of iterations used to filter the reconstructed version of the input picture to obtain the output version of the input picture is fixed.

21. The method of claim 9, wherein the filtering involves performing a plurality of iterations, and a same filter type is used for each of the plurality of iterations.

22. The method of claim 9, wherein the adaptive filtering involves performing a plurality of iterations, and a plurality of filters are used in one or more of the plurality of iterations.

23. The method of claim 9, wherein the adaptive filtering is utilized in at least one of an in-loop filtering configuration and an out-of-loop filtering configuration.

* * * * *